June 25, 1957 G. A. LYON Re. 24,335

WHEEL COVER

Original Filed Aug. 7, 1948 2 Sheets-Sheet 1

Inventor
George Albert Lyon by The Firm of Charlesworth & Attys

WHEEL COVER

Original Filed Aug. 7, 1948 2 Sheets-Sheet 2

Inventor
George Albert Lyon by The Firm of Charles W. Hills Attys

United States Patent Office

Re. 24,335
Reissued June 25, 1957

24,335

WHEEL COVER

George Albert Lyon, Detroit, Mich.

Original No. 2,624,626, dated January 6, 1953, Serial No. 43,062, August 7, 1948. Application for reissue January 24, 1957, Serial No. 636,221

15 Claims. (Cl. 301—37)

Matter enclosed in heavy brackets [ ] appears in the original patent but forms no part of this reissue specification; matter printed in italics indicates the additions made by reissue.

This invention relates to a cover structure and more particularly to automobile wheel covers.

An object of this invention is to provide a wheel cover with cushioning and centering means which can be made out of the scrap at the four corners of a blank from which the cover is stamped.

Another object of this invention is to provide a cover with equidistantly spaced reinforcing abutments for centering and cushioning engagement with a flange of the rim part.

Yet another object of this invention is to provide a cover with means for yieldable engagement with the tire rim independently of the retaining means and which engagement will enable the cover to be floatingly carried on the wheel whereby it can readily accommodate any slight variations in the relative locations of the rim and body parts of the wheel.

In accordance with the general features of this invention there is provided in a cover structure for a wheel including flanged tire rim and body parts, a circular cover having an underturned outer peripheral edge and four corners extending axially rearwardly from the edge and comprising arcuate hollow segments each having a yieldable tip for cam-like engagement with a rim flange to center and floatingly support the cover on the wheel.

Another feature of the invention relates to the detachable retention of the aforesaid cover on the wheel independently of its aforesaid cushioning engagement therewith whereby the centering end of the cover on the wheel is not dependent on the retaining means.

Yet another feature of this invention relates to the provision of the aforesaid cover in two forms; one of which the cover comprises a so-called full disk and in the other of which the cover comprises an annular ring.

Other objects and features of this invention will more fully appear from the following detailed description taken in connection with the accompaying drawings which illustrate several embodiments thereof and in which.

Figure 1:
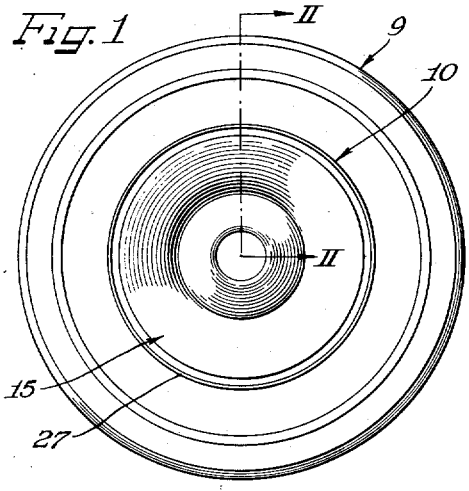
Figure 1 is a side view of a wheel structure having a cover comprising the features of this invention.
Figure 2:
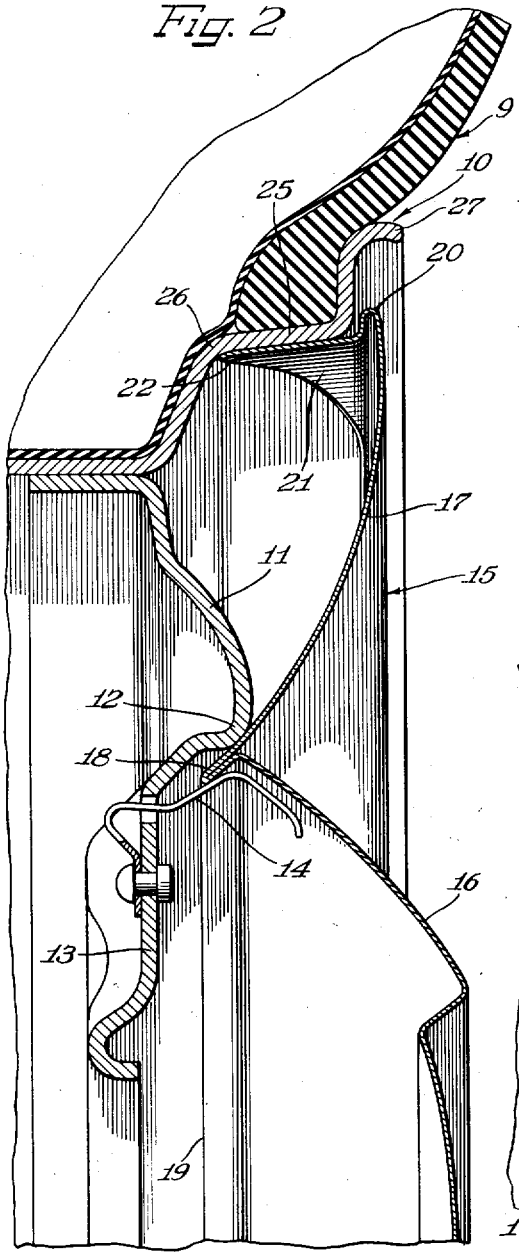
Figure 2 is an enlarged fragmentary cross-sectional view taken on substantially the line II—II of Figure 1 looking in the direction indicated by the arrows.
Figure 4:
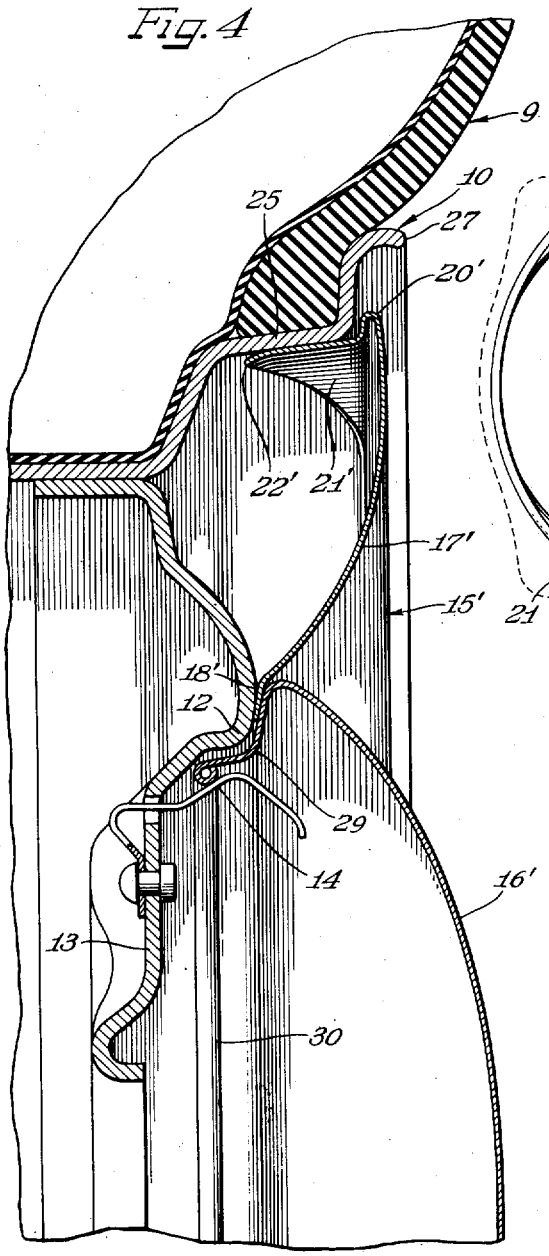
Figure 5:
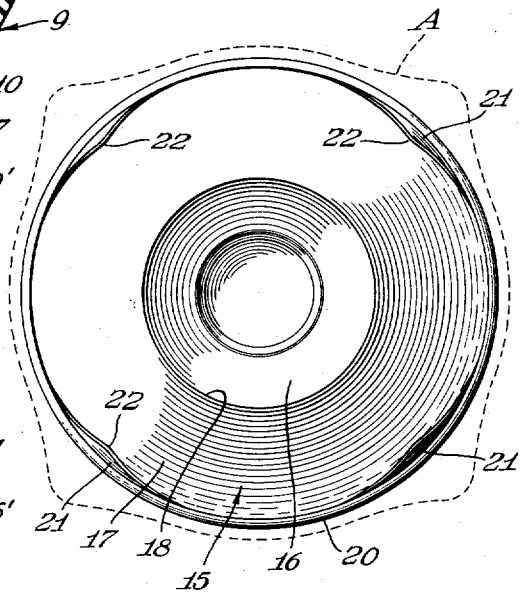

Figure 4 is a fragmentary cross-sectional view similar to Figure 2 but showing a modification wherein the cover is in the form of a ring and a separate hub cap is employed to detachably clamp the cover to the wheel; and Figure 5 is a rear view of the cover shown in Figure 2 and showing how, by dotted lines, the material of the blank is utilized in the forming of the four entering corners of the cover.

As shown in the drawings:

The reference characaer 9 is employed to designate generally a conventional pneumatic tire and tube assembly mounted in the usual way upon a multi-flanged or stepped drop center type of tire rim 10. This tire rim is supported in the usual way upon a dished metallic body member 11 having a bulged center nose portion 12 and the usual bolt-on flange 13 by means of which the wheel may be detachably fastened to a brake drum assembly or an automobile wheel axle. The bolt-on flange 13 carries a plurality of goose-neck spring clips 14 which may be of any suitable number, such, for example, as 3 to 5. These clips are circumferentially equidistantly spaced about the axis of the wheel.

It should be noted that these clips are of the type that are well known in the automotive field and have been used extensively in the detachable holding of the hub caps on the wheel. They permit of a so-called "easy-on hard-off" action in the mounting and removal of the cap or cover.

Detachably cooperative with the spring clips 14 is a wheel cover designated generally by the reference character 15 embracing the features of this invention. This cover comprises a stamping made from any suitable sheet material such, for example, as steel sheet or stainless steel.

In the fabrication of wheel covers and hub caps it is customary to stamp them from sheet metal and since they are of circular shape the material left over at the four corners of the sheet is usually disposed of as scrap. I propose, in accordance with the features of this invention, to utilize this material in providing the wheel cover with cushioning and centering means for floatingly supporting the cover on the wheel.

Figure 3:
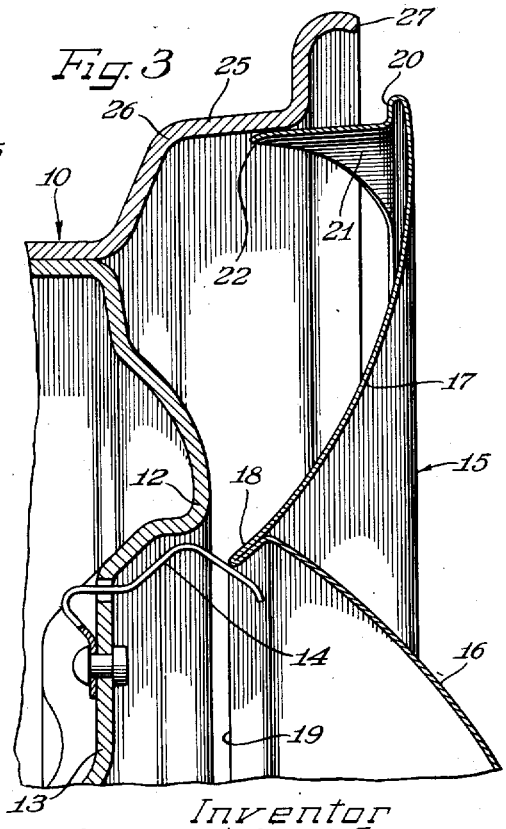
Figure 3 is a fragmentary cross-sectional view similar to Figure 2 but differing therefrom in that it shows the cover in the process of being pushed onto the wheel.

As best shown in Figure 3 the wheel cover 15 of my invention includes a central portion 16 connected to an outer convexly curved ring portion 17. The junction of the two portions 16 and 17 comprises an underturned double thickness skirt 18 having an edge 19 of such diameter that the same can be cammed over the humps of the clips [14] into retained engagement with the nose portion 12 of the wheel, as shown in Figure 2. In this action the clips yield radially inwardly until the edge 19 passes over the high points of the same at which time the clips snap outwardly and resiliently wedge the edge 19 toward the nose portion 12.

The outer periphery of the cover portion 17 is turned rearwardly upon itself to form a continuous double thickness edge 20. By thus forming the outer edge 20 of the cover I am able to rigidify the cover at the point of application of the pry-off force in the removal of the cover from the wheel. It will be clear from Figure 2 that the edge 20 is slightly spaced from the adjoining flange of the rim when the cover is on the wheel and also is spaced radially inwardly from the adjoining outer edge 27 of the rim. In the removal of the cover a screw driver is inserted between the edge 27 and the edge 20 until it is engaged behind the edge 20 at which time by twisting of the screw driver the cover may be forcibly ejected from the wheel.

Now my present invention is particularly concerned with the provision of cushioning and centering elements 21 on the outer part of the cover and which can be made out of the four corners of the blank from which the cover 15 is stamped. These elements 21, due to the fact that they are made from the four corners of the blank, are circumferentially equidistantly spaced about the axis of the cover or wheel. The elements are identical and each of them comprises an axially rearwardly extending arcuate hollow segment connected directly to the extremity of the turned edge 20. *Each of the arcuate elements 21 cooperate with the convexly curved ring or body portion 17 to define a hollow arcuate pocket opening radially outwardly into the interior of the underturned*

*outer margin at the hollow beaded edge 20.* Each element terminates in a slightly bent tip or point 22 so as to facilitate sliding of the element inside of the rim flange 25 as the cover is moved home onto the wheel.

In the application of the cover to the wheel the edges 19 of skirt 18 is placed over the extremities of the spring clips 14 at which time the tips 22 of the corner elements 21 will have entered the wheel flange 25, as shown in Figure 3.

Thereafter, as the cover is pushed axially inwardly on the wheel to snap it into retained engagement therewith the edge 19 cams the spring clips inwardly as noted before and the tips 22 of elements 21 slide along the surface of rim flange 25 until they bottom at 26 on the radial flange of the rim, as shown in Figure 2.

The diameter of the circle common to tips 22 is such that the elements 21 must yield slightly radially inwardly as they move further into the rim flange. This results in these elements having a resilient or cushioned engagement with the rim flange so that the cover is floatingly supported on the rim as well as on the spring clips 14. By preference, the elements 21 are formed substantially straight in their axial extent from the juncture with the underturned generally radially inwardly extending marginal portion of the cover to the respective tips 22. Initially or in the unassembled condition of the cover the elements 21 extend at less, if any, angularity to the axis of the cover than the intermediate tire rim flange 25 extends to the axis of the wheel, such flange characteristically extending generally frusto-conically tapered axially and radially outwardly. In Figure 3 this difference in angularity is illustrated. As a result, as the cover is pushed inwardly and the retaining element tips 22 cam along the inner surface of the rim flange 25, the retaining elements 21 are progressively stressed radially inwardly and finally engage under resilient stress in face-to-face relation against the rim flange.

The foregoing floating feature of my cover is advantageous from the standpoint in that it enables the cover to better accommodate slight manufacturing tolerances in the manufacture of the rim and body parts of the wheel. For illustration, these parts may be displaced as much as ⅛ of an inch relative to each other and my cover would still snugly fit the wheel without rattling irrespective of such variations.

In Figure 4 I have illustrated a modification of the invention wherein the same numerals are employed to designate parts of the wheel common to that figure and to Figure 2. In this form of the invention the cover 15' is of a two-piece construction instead of a one-piece, as in Figure 2, and includes a central hub cap 16' and an outer ring portion 17'. The cover 16' has an underturned skirt 29 terminating in a turned edge 30 adapted to engage the spring clips 14 in much the same manner as the edge 19.

The ring portion 17' of the cover assembly has a radially inner annular portion 18' adapted to be engaged by the outer periphery of the hub cap 16' so as to be clamped against the nose portion 12 of the body part 11, as shown in Figure 4.

The outer periphery of the ring portion 17' has a turned edge 20' terminating in arcuate cushioning elements 21' which are identical to the elements 21 with the exception that they do not extend as far into the wheel. Each of these elements 21' comprises a corner of the blank and is made of a hollow arcuate segmental construction. The element terminates in a turned tip 22 which, as shown in Figure 4, does not bottom against a radial flange of the rim when the cover assembly is on the wheel. However, the inner portions of each of the elements 21' are arranged in a circle of a diameter such that these portions must resiliently yield as they slide along the rim flange 25. This results in these elements 21' having a resilient or cushioned engagement with the rim flange 25.

In the application of this form of the cover the ring portion 15' is first placed on the wheel with the elements 21' entering the flange 25. Thereafter, the ring portion 17' is pushed axially into the wheel until its flange 18' bottoms against the nose portion 12 of the wheel body part 11. When in this position the ring portion 17' is floatingly supported on the wheel by reason of the resilient engagement of rim flange 25 by the corner elements 21'.

The ring portion 17' is then clamped to the wheel between hub caps 16' which is snapped into engagement with the spring clips 14 in the usual way.

To remove this cover the hub cap 16' is first pried off of the wheel by a screw driver and thereafter a screw driver is inserted under the edge 20' of ring 17' to disengage it from its yieldable contact with flange 25.

The ring 17' can be stamped from any suitable sheet material and the corners of the blank utilized, in the manner previously described, to make the cushioning elements 21'.

In Figure 5 I have illustrated how the first form of my cover 15 is stamped from sheet material, the dotted line A showing the contour of the stamping prior to the forming of the edge 20 and the corner retaining elements 21 out of the marginal portion of the blank A. In other words, the dotted line A shows the contour of the stamping from the sheet material and shows the corner portions that are formed by subsequent pressing operations into the corner elements 21.

The form of ring 17' is made in the same manner as the cover 15 with the exception that a center hole is punched in the stamping in as much as the center portion of the stamping is not used in the cover.

I claim as by invention:

1. In a cover structure for a wheel including a flanged tire rim and body parts, a circular cover having an underturned outer peripheral edge and four cushioning and centering elements extending axially rearwardly from the edge and comprising arcuate hollow segments each having a yieldable tip for cam-like engagement with a rim flange to center and resiliently support the cover on a wheel, said cover having central means projecting rearwardly for snap-on cover retaining engagement with wheel-carried cover retaining means.

2. As an article of manufacture, a circular wheel cover having at four circumferentially equidistantly spaced portions of the periphery of the same rearwardly extending arcuate hollow segments each terminating in a free tip for yieldable contact with a wheel part in the use of the cover, said cover being in the form of a ring terminating at its radially inner margin in an annular flange for defining a seat for a hub cap.

3. As an article of manufacture, a circular wheel cover having at four circumferentially equidistantly spaced portions of the periphery of the same rearwardly extending arcuate hollow segments each terminating in a free tip for yieldable contact with a wheel part in the use of the cover, said cover comprising divergent central crown and radially outer ring portions having at their junction an annular shoulder for snap-on retaining cooperation with elements on a wheel.

4. In a wheel structure including a wheel body and a tire rim of multi-flange formation including a generally axially outwardly extending and slightly radially outwardly tapered intermediate flange, a cover for disposition at the outer side of the wheel and including a body portion overlying the wheel body and substantially concealing the tire rim and having an underturned outer margin including a plurality of circumferentially spaced axially inwardly extending transversely arcuate supporting and cushioning elements engaging in frictional facewise relation against the inner surface of the tire rim intermediate flange and being progressively stressed radially inwardly from their axially inner tips.

5. In a wheel structure including a wheel body and a tire rim of multi-flange formation including a generally axially outwardly extending and slightly radially outwardly tapered intermediate flange, a cover for disposition at the outer side of the wheel and including a body portion overlying the wheel body and substantially concealing the tire rim and having an underturned outer margin including a plurality of circumferentially spaced axially inwardly extending transversely arcuate supporting and cushioning elements engaging in frictional facewise relation against the inner surface of the tire rim intermediate flange and being progressively stressed radially inwardly from their axially inner tips, said elements being substantially straight in their axial dimension and having the tips thereof bottomed against a generally radially extending side flange of the tire rim.

6. In a wheel structure including a wheel body and a tire rim of multi-flange formation including a generally axially outwardly extending and slightly radially outwardly tapered intermediate flange, a cover for disposition at the outer side of the wheel and including a body portion overlying the wheel body and substantially concealing the tire rim and having an underturned outer margin including a plurality of circumferentially spaced axially inwardly extending transversely arcuate supporting and cushioning elements engaging in frictional facewise relation against the inner surface of the tire rim intermediate flange and being progressively stressed radially inwardly from their axially inner tips, said elements supporting the outer margin of the cover in axially outwardly spaced relation to the adjacent portion of the tire rim and axially inwardly relative to a plane across the extremity of the terminal flange of the tire rim.

7. As an article of manufacture, a circular wheel cover having at circumferentially spaced positions at its outer periphery generally axially inwardly extending elongated arcuate hollow segments radially resiliently yieldable for camming resilient engagement with a generally axially extending rim flange of a tire rim, and means on said cover member spaced radially inwardly from said segments for retaining engagement with means on a wheel spaced radially inwardly from the tire rim of the wheel.

8. As an article of manufacture, a circular wheel cover having at circumferentially spaced positions at its outer periphery generally axially inwardly extending elongated arcuate hollow segments radially resiliently yieldable for camming resilient engagement with a generally axially extending rim flange of a tire rim, and means on said cover member spaced radially inwardly from said segments for retaining engagement with means on a wheel spaced radially inwardly from the tire rim of the wheel, said radially inward means on the cover comprising an underturned fold.

9. As an article of manufacture, a circular wheel cover having at circumferentially spaced positions at its outer periphery generally axially inwardly extending elongated arcuate hollow segments radially resiliently yieldable for camming resilient engagement with a generally axially extending rim flange of a tire rim, and means on said cover member spaced radially inwardly from said segments for retaining engagement with means on a wheel spaced radially inwardly from the tire rim of the wheel, said radially inward means on the cover comprising a generally radially inwardly extending flange.

10. In a wheel structure including a wheel body having a central portion with cover retaining spring clips thereon and a tire rim of multi-flange formation at the outer periphery of the wheel body and including a generally axially outwardly extending and slightly radially outwardly tapered intermediate flange, a cover for disposition at the outer side of the wheel and including a body portion overlying the wheel body and substantially concealing the tire rim and having an underturned outer margin including a plurality of circumferentially spaced axially inwardly extending transversely arcuate supporting and cushioning elements engaging in frictional facewise relation against the inner surface of the tire rim intermediate flange and being progressively stressed radially inwardly from their axially inner tips, said cover body portion having a flange extending inwardly therefrom and engageable in snap-on pry-off relation with said spring clips.

11. In a wheel structure including a wheel body having a central portion with cover retaining spring clips thereon and a tire rim of multiflange formation at the outer periphery of the wheel body and including a generally axially outwardly extending and slightly radially outwardly tapered intermediate flange, a cover for disposition at the outer side of the wheel and including a body portion overlying the wheel body and substantially concealing the tire rim and having an underturned outer margin including a plurality of circumferentially spaced axially inwardly extending transversely arcuate supporting and cushioning elements engaging in frictional facewise relation against the inner surface of the tire rim intermediate flange and being progressively stressed radially inwardly from their axially inner tips, said body portion of the cover being of annular form and having an inner margin lying against the wheel body, and a hub cap retainingly engaging said clips and clamping said inner margin against the wheel body.

*12. The cover structure of claim 4 further characterized by the underturned outer margin of the cover comprising an annular hollow bead composed of a double thickness for resisting distortion of the cover under pry-off pressure.*

*13. The cover structure of claim 4 further characterized by the underturned outer margin of the cover comprising a hollow bead of relatively narrow radial extent in comparison with the cover body portion and serving to rigidify and back up said supporting elements in their stressed engagement with the intermediate rim flange, said elements being offset radially inward from said bead.*

*14. The cover structure of claim 4 further characterized by said arcuate elements each defining with the cover body portion a hollow arcuate pocket opening radially outwardly into the interior of said underturned outer margin.*

*15. The cover structure of claim 4 further characterized by said arcuate elements each defining with the cover body portion a hollow arcuate pocket opening radially outwardly into the interior of said underturned outer margin and by said elements being substantially equidistantly spaced from each other at four corners of the blank comprising said cover.*

References Cited in the file of this patent or the original patent

UNITED STATES PATENTS

| | | |
|---|---|---|
| 1,944,658 | Griffith | Jan. 23, 1934 |
| 2,016,395 | Sinclair | Oct. 8, 1935 |
| 2,113,541 | Blank | Apr. 5, 1938 |
| 2,368,238 | Lyon | Jan. 30, 1945 |
| 2,404,389 | Lyon | July 23, 1946 |